US008380486B2

(12) United States Patent
Soricut et al.

(10) Patent No.: US 8,380,486 B2
(45) Date of Patent: Feb. 19, 2013

(54) PROVIDING MACHINE-GENERATED TRANSLATIONS AND CORRESPONDING TRUST LEVELS

(75) Inventors: Radu Soricut, Manhattan Beach, CA (US); Narayanaswamy Viswanathan, Palo Alto, CA (US); Daniel Marcu, Hermosa Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 665 days.

(21) Appl. No.: 12/572,021

(22) Filed: Oct. 1, 2009

(65) Prior Publication Data
US 2011/0082683 A1 Apr. 7, 2011

(51) Int. Cl.
*G06F 17/28* (2006.01)
(52) U.S. Cl. .............................................. 704/2; 704/5
(58) Field of Classification Search .................. 704/1–10
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |

(Continued)

FOREIGN PATENT DOCUMENTS

| | | |
|---|---|---|
| EP | 0469884 | 2/1992 |
| EP | 0715265 | 6/1996 |

(Continued)

OTHER PUBLICATIONS

Papineni et al. "Blue: a Method for Automatic Evaluation of Machine Translation", Proc. of the 40th Annual Meeting of the Association for Computational Linguistics (ACL), Jul. 2002.*

(Continued)

*Primary Examiner* — Samuel G Neway
(74) *Attorney, Agent, or Firm* — Carr & Ferrell LLP

(57) ABSTRACT

A quality-prediction engine predicts a trust level associated with translational accuracy of a machine-generated translation. Training a quality-prediction may include translating a document in a source language to a target language by executing a machine-translation engine stored in memory to obtain a machine-generated translation. The training may further include comparing the machine-generated translation with a human-generated translation of the document. The human-generated translation is in the target language. Additionally, the training may include generating a mapping between features of the machine-generated translation and features of the human-generated translation based on the comparison.

20 Claims, 6 Drawing Sheets

U.S. PATENT DOCUMENTS

| | | |
|---|---|---|
| 5,267,156 A | 11/1993 | Nomiyama |
| 5,268,839 A | 12/1993 | Kaji |
| 5,295,068 A | 3/1994 | Nishino et al. |
| 5,311,429 A | 5/1994 | Tominaga |
| 5,387,104 A | 2/1995 | Corder |
| 5,408,410 A * | 4/1995 | Kaji .................................... 704/2 |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,966,685 A | 10/1999 | Flanagan et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,085,708 B2 | 8/2006 | Manson |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 * | 3/2007 | Okura et al. ...................... 704/7 |
| 7,197,451 B1 | 3/2007 | Carter et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,319,949 B2 | 1/2008 | Pinkham |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,356,457 B2 | 4/2008 | Pinkham et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,409,332 B2 | 8/2008 | Moore |
| 7,447,623 B2 | 11/2008 | Appleby |

| | | |
|---|---|---|
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,620,538 B2 | 11/2009 | Marcu et al. |
| 7,624,005 B2 | 11/2009 | Koehn et al. |
| 7,624,020 B2 | 11/2009 | Yamada et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,822,596 B2 * | 10/2010 | Elgazzar et al. .................. 704/2 |
| 7,957,953 B2 | 6/2011 | Moore |
| 7,974,833 B2 | 7/2011 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0078091 A1 | 6/2002 | Vu et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0217052 A1 | 11/2003 | Rubenczyk et al. |
| 2003/0233222 A1 | 12/2003 | Soricut et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |
| 2004/0111253 A1 | 6/2004 | Luo et al. |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0060160 A1 | 3/2005 | Roh et al. |
| 2005/0075858 A1 | 4/2005 | Pournasseh et al. |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0078845 A1 * | 4/2007 | Scott et al. .................. 707/5 |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168450 A1 | 7/2007 | Prajapat et al. |
| 2007/0180373 A1 | 8/2007 | Bauman et al. |
| 2007/0219774 A1 * | 9/2007 | Quirk et al. .................. 704/2 |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore |
| 2008/0052061 A1 | 2/2008 | Kim et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0174524 A1 | 7/2010 | Koehn |
| 2011/0029300 A1 | 2/2011 | Marcu et al. |
| 2011/0082684 A1 | 4/2011 | Soricut et al. |

FOREIGN PATENT DOCUMENTS

| | | |
|---|---|---|
| EP | 0933712 A2 | 8/1999 |
| EP | 0933712 A3 | 1/2001 |
| JP | 07244666 | 9/1995 |
| JP | 10011447 | 1/1998 |
| JP | 11272672 | 10/1999 |

OTHER PUBLICATIONS

"Elhadad, Michael, ""FUF: the Universal Unifier User Manual Version 5.2""", 1993, Department of Computer Science, Ben Gurion University, Beer Sheva, Israel."

"Elhadad, Michael, ""Using Argumentation to Control Lexical Choice: A Functional Unification Implementation"",1992, Ph.D. Thesis, Graduate School of Arts and Sciences, Columbia University."

"Elhadad, M. and Robin, J., ""SURGE: a Comprehensive Plug-in Syntactic Realization Component for TextGeneration"", 1999 (available at http://www.cs.bgu.ac.il/-elhadad/pub.html)."

Fleming, Michael et al., "Mixed-Initiative Translation of Web Pages," AMTA 2000, LNAI 1934, Springer-Verlag, Berlin, Germany, 2000, pp. 25-29.

Och, Franz Josef and Ney, Hermann, "Improved Statistical Alignment Models" ACLOO:Proc. of the 38th Annual Meeting of the Association for Computational Linguistics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.

Ren, Fuji and Shi, Hongchi, "Parallel Machine Translation: Principles and Practice," Engineering of Complex Computer Systems, 2001 Proceedings, Seventh IEEE Int'l. Conference, pp. 249-259, 2001.

Fung et al, "Mining Very-Non-Parallel Corpora: Parallel Sentence and Lexicon Extraction via Bootstrapping and EM", in EMNLP 2004.

"Fung, P. and Yee, L., ""An IR Approach for Translating New Words from Nonparallel, Comparable Texts""", 1998,36th Annual Meeting of the ACL, 17th International Conference on Computational Linguistics, pp. 414-420."

"Fung, Pascale, ""Compiling Bilingual Lexicon Entries From a Non-Parallel English-Chinese Corpus""", 1995, Proc. ofthe Third Workshop on Very Large Corpora, Boston, MA, pp. 173-183."

"Gale, W. and Church, K., ""A Program for Aligning Sentences in Bilingual Corpora,""1991, 29th Annual Meeting ofthe ACL, pp. 177-183."

Gale, W. and Church, K., "A Program for Aligning Sentences in Bilingual Corpora," 1993, Computational Linguisitcs, vol. 19, No. 1, pp. 75-102.

Galley et al., "Scalable Inference and Training of Context-Rich Syntactic Translation Models," Jul. 2006, in Proc. Of the 21st International Conference on Computational Linguistics, pp. 961-968.

Galley et al., "What's in a translation rule?", 2004, in Proc. Of HLT/NAACL '04, pp. 1-8.

Gaussier et al, "A Geometric View on Bilingual Lexicon Extraction from Comparable Corpora", In Proceedings of ACL 2004, July.

"Germann et al., ""Fast Decoding and Optimal Decoding for Machine Translation""", 2001, Proc. ofthe 39th AnnualMeeting of the ACL, Toulouse, France, pp. 228-235."

"Germann, Ulrich: ""Building a Statistical Machine Translation System from Scratch: How Much Bang for theBuck Can We Expect?""" Proc. of the Data-Driven MT Workshop of ACL-01, Toulouse, France, 2001."

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

"Grefenstette, Gregory, ""The World Wide Web as a Resource for Example-Based Machine TranslationTasks""", 1999, Translating and the Computer 21, Proc. of the 21 st International Cant. on Translating and theComputer. London, UK, 12 pp."

Grossi et al, "Suffix Trees and Their Applications in String Algorithms", In Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

"Hatzivassiloglou, V. et al., ""Unification-Based Glossing""", 1995, Proc. of the International Joint Conference onArtificial Intelligence, pp. 1382-1389."

Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Bikel, D., Schwartz, R., and Weischedei, R., "An Algorithm that Learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

"Jelinek, F., ""Fast Sequential Decoding Algorithm Using a Stack""", Nov. 1969, IBM J. Res. Develop., vol. 13, No. 6, pp. 675-685."

"Jones, K. Sparck, ""Experiments in Relevance Weighting of Search Terms""", 1979, Information Processing & Management, vol. 15, Pergamon Press Ltd., UK, pp. 133-144."

Klein et al., "Accurate Unlexicalized Parsing," Jul. 2003, in Proc. of the 41st Annual Meeting of the ACL, pp. 423-430.

"Knight et al., ""Integrating Knowledge Bases and Statistics in MT,""1994, Proc. of the Conference of the Associationfor Machine Translation in the Americas."

"Knight et al., ""Filling Knowledge Gaps in a Broad-Coverage Machine Translation System""", 1995, Proc. ofthe14th International Joint Conference on Artificial Intelligence, Montreal, Canada, vol. 2, pp. 1390-1396."

"Knight, K. and Al-Onaizan, Y., ""A Primer on Finite-State Software for Natural Language Processing""", 1999 (available at http://www.isLedullicensed-sw/carmel)."

Knight, K. and Al-Onaizan, Y., "Translation with Finite-State Devices," Proceedings of the 4th AMTA Conference, 1998.

"Knight, K. and Chander, I., ""Automated Postediting of Documents,""1994, Proc. of the 12th Conference on ArtificialIntelligence, pp. 779-784."

Knight, K. and Graehl, J., "Machine Transliteration", 1997, Proc. of the ACL-97, Madrid, Spain, pp. 128-135.

"Knight, K. and Hatzivassiloglou, V., ""Two-Level, Many-Paths Generation,"" 1995, Proc. of the 33rd AnnualConference of the ACL, pp. 252-260."

"Knight, K. and Luk, S., ""Building a Large-Scale Knowledge Base for Machine Translation,"" 1994, Proc. of the 12thConference on Artificial Intelligence, pp. 773-778."

"Knight, K. and Marcu, D., ""Statistics-Based Summarization—Step One: Sentence Compression,"" 2000, AmericanAssociation for Artificial Intelligence Conference, pp. 703-710."

"Knight, K. and Yamada, K., ""A Computational Approach to Deciphering Unknown Scripts,"" 1999, Proc. of the ACLWorkshop on Unsupervised Learning in Natural Language Processing."

"Knight, Kevin, ""A Statistical MT Tutorial Workbook,"" 1999, JHU Summer Workshop (available at http://www.isLedu/natural-language/mUwkbk.rtf)."

Knight, Kevin, "Automating Knowledge Acquisition for Machine Translation," 1997, AI Magazine, vol. 18, No. 4.

"Knight, Kevin, ""Connectionist Ideas and Algorithms,"" Nov. 1990, Communications of the ACM, vol. 33, No. 11, pp. 59-74."

"Knight, Kevin, ""Decoding Complexity in Word-Replacement Translation Models""", 1999, Computational Linguistics, vol. 25, No. 4."

"Knight, Kevin, ""Integrating Knowledge Acquisition and Language Acquisition""", May 1992, Journal of AppliedIntelligence, vol. 1, No. 4."

"Knight, Kevin, ""Learning Word Meanings by Instruction,""1996, Proc. of the D National Conference on ArtificialIntelligence, vol. 1, pp. 447-454."

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

"Koehn, P. and Knight, K., ""ChunkMT: Statistical Machine Translation with Richer Linguistic Knowledge,""" Apr. 2002,Information Sciences Institution."

"Koehn, P. and Knight, K., ""Estimating Word Translation Probabilities from Unrelated Monolingual Corpora Usingthe EM Algorithm,""" 2000, Proc. of the 17th meeting of the AAAI."

"Rapp, Reinhard, ""Identifying Word Translations in Non-Parallel Texts,""" 1995, 33rd Annual Meeting of the ACL, pp. 320-322."

Rayner et al.,"Hybrid Language Processing in the Spoken Language Translator," IEEE, pp. 107-110.

"Resnik, P. and Smith, A., ""The Web as a Parallel Corpus,""" Sep. 2003, Computational Linguistics, SpecialIssue on Web as Corpus, vol. 29, Issue 3, pp. 349-380."

"Resnik, P. and Yarowsky, D. ""A Perspective on Word Sense Disambiguation Methods and Their Evaluation,""1997, Proceedings of SIGLEX '97, Washington, D.C., pp. 79-86."

"Resnik, Philip, ""Mining the Web for Bilingual Text,"" 1999, 37th Annual Meeting of the ACL, College Park, MD, pp. 527-534."

Rich, E. and Knight, K., "Artificial Intelligence, Second Edition," 1991, McGraw-Hill Book Company [Front Matter].

"Richard et al., ""Visiting the Traveling Salesman Problem with Petri nets and application in the glass industry,""Feb. 1996, IEEE Emerging Technologies and Factory Automation, pp. 238-242."

"Robin, Jacques, ""Revision-Based Generation of Natural Language Summaries Providing Historical Background: Corpus-Based Analysis, Design Implementation and Evaluation,"" 1994, Ph.D. Thesis, Columbia University, New York."

Rogati et al., "Resource Selection for Domain-Specific Cross-Lingual IR," ACM 2004, pp. 154-161.

Zhang, R. et al., "The NiCT-ATR Statistical Machine Translation System for the IWSLT 2006 Evaluation," submitted to IWSLT, 2006.

"Russell, S. and Norvig, P., ""Artificial Intelligence: A Modern Approach,"" 1995, Prentice-Hall, Inc., New Jersey [Front Matter]."

"Sang, E. and Buchholz, S., ""Introduction to the CoNLL-2000 Shared Task: Chunking,"" 2002, Proc. of CoNLL-2000 and LLL-2000, Lisbon, Portugal, pp. 127-132."

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.

"Schutze, Hinrich, ""Automatic Word Sense Discrimination,"" 1998, Computational Linguistics, Special Issue on WordSense Disambiguation, vol. 24, Issue 1, pp. 97-123."

"Selman et al., ""A New Method for Solving Hard Satisfiability Problems,"" 1992, Proc. of the 10th National Conference on Artificial Intelligence, San Jose, CA, pp. 440-446."

Kumar, S. and Byrne, W., "Minimum Bayes-Risk Decoding for Statistical Machine Translation." HLTNAACL Conference. Mar. 2004, 8 pages.

"Shapiro, Stuart (ed.), ""Encyclopedia of Artificial Intelligence, 2nd edition"", vol. D 2,1992, John Wiley & Sons Inc;""Unification"" article, K. Knight, pp. 1630-1637."

Shirai, S., "A Hybrid Rule and Example-based Method for Machine Translation," NTT Communication Science Laboratories, pp. 1-5.

"Sobashima et al., ""A Bidirectional Transfer-Driven Machine Translation System for Spoken Dialogues,"" 1994, Proc. of 15th Conference on Computational Linguistics, vol. 1, pp. 64-68."

"Soricut et al., ""Using a Large Monolingual Corpus to Improve Translation Accuracy,"" 2002, Lecture Notes in Computer Science, vol. 2499, Proc. of the 5th Conference of the Association for Machine Translation in the Americas on Machine Translation: From Research to Real Users, pp. 155-164."

"Stalls, B. and Knight, K., ""Translating Names and Technical Terms in Arabic Text,"" 1998, Proc. of the COLING/ACL Workkshop on Computational Approaches to Semitic Language."

"Sumita et al., ""A Discourse Structure Analyzer for Japanese Text,"" 1992, Proc. of the International Conference on Fifth Generation Computer Systems, vol. 2, pp. 1133-1140."

"Sun et al., ""Chinese Named Entity Identification Using Class-based Language Model,"" 2002, Proc. of 19th International Conference on Computational Linguistics, Taipei, Taiwan, vol. 1, pp. 1-7."

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

"Taylor et al., ""The Penn Treebank: An Overview,"" in A. Abeill (ed.), D Treebanks: Building and Using ParsedCorpora, 2003, pp. 5-22."

"Tiedemann, Jorg, ""Automatic Construction of Weighted String Similarity Measures,"" 1999, in Proceedings ofthe Joint SIGDAT Conference on Emperical Methods in Natural Language Processing and Very Large Corpora."

"Tillman, C. and Xia, F., ""A Phrase-Based Unigram Model for Statistical Machine Translation,"" 2003, Proc. of the North American Chapter of the ACL on Human Language Technology, vol. 2, pp. 106-108."

"Tillmann et al., ""A DP Based Search Using Monotone Alignments in Statistical Translation,"" 1997, Proc. of the Annual Meeting of the ACL, pp. 366-372."

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

"Ueffing et al., ""Generation of Word Graphs in Statistical Machine Translation,"" 2002, Proc. of Empirical Methods in Natural Language Processing (EMNLP), pp. 156-163."

Varga et al., "Parallel Corpora for Medium Density Languages", In Proceedings of RANLP 2005, pp. 590-596.

"Veale, T. and Way, A., ""Gaijin: A Bootstrapping, Template-Driven Approach to Example-Based MT,"" 1997, Proc. of New Methods in Natural Language Processing (NEMPLP97), Sofia, Bulgaria."

Vogel et al., "The CMU Statistical Machine Translation System," 2003, Machine Translation Summit IX, New Orleans, LA.

"Vogel et al., ""The Statistical Translation Module in the Verbmobil System,"" 2000, Workshop on Multi-Lingual SpeechCommunication, pp. 69-74."

"Vogel, S. and Ney, H., ""Construction of a Hierarchical Translation Memory,"" 2000, Proc. of Cooling 2000, Saarbrucken, Germany, pp. 1131-1135."

"Wang, Y. and Waibel, A., ""Decoding Algorithm in Statistical Machine Translation,"" 1996, Proc. of the 35th AnnualMeeting of the ACL, pp. 366-372."

"Wang, Ye-Yi, ""Grammar Inference and Statistical Machine Translation,"" 1998, Ph.D Thesis, Carnegie MellonUniversity, Pittsburgh, PA."

"Watanabe et al., ""Statistical Machine Translation Based on Hierarchical Phrase Alignment,"" 2002, 9th InternationalConference on Theoretical and Methodological Issues in Machin Translation (TMI-2002), Keihanna, Japan, pp. 188-198."

"Witbrock, M. and Mittal, V., ""Ultra-Summarization: A Statistical Approach to Generating Highly Condensed Non-Extractive Summaries,"" 1999, Proc. of SIGIR '99, 22nd International Conference on Research and Development inInformation Retrieval, Berkeley, CA, pp. 315-316."

"Wu, Dekai, ""A Polynomial-Time Algorithm for Statistical Machine Translation,"" 1996, Proc. of 34th Annual Meeting ofthe ACL, pp. 152-158."

"Wu, Dekai, ""Stochastic Inversion Transduction Grammars and Bilingual Parsing of Parallel Corpora,"" 1997, Computational Linguistics, vol. 23, Issue 3, pp. 377-403."

"Yamada, K. and Knight, K. ""A Syntax-Based Statistical Translation Model,"" 2001, Proc. of the 39th AnnualMeeting of the ACL, pp. 523-530."

"Yamada, K. and Knight, K., ""A Decoder for Syntax-Based Statistical MT,"" 2001, Proceedings of the 40th AnnualMeeting of the ACL, pp. 303-310."

Yamada K., "A Syntax-Based Statistical Translation Model," 2002 PhD Dissertation, pp. 1-141.

"Yamamoto et al., ""A Comparative Study on Translation Units for Bilingual Lexicon Extraction,"" 2001, JapanAcademic Association for Copyright Clearance, Tokyo, Japan."

Yamamoto et al, "Acquisition of Phrase-level Bilingual Correspondence using Dependency Structure" in Proceedings of COLING-2000, pp. 933-939.

"Yarowsky, David, ""Unsupervised Word Sense Disambiguation Rivaling Supervised Methods,"" 1995, 33rd AnnualMeeting of the ACL, pp. 189-196."

Zhang et al., "Synchronous Binarization for Machine Translations," Jun. 4-9, 2006, in Proc. of the Human Language Technology Conference of the North American Chapter of the ACL, pp. 256-263.

Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

"Patent Cooperation Treaty International Preliminary Report on Patentability and the Written Opinion, Internationalapplication No. PCT/US2008/004296, Oct. 6, 2009, 5 pgs."

Document, Wikipedia.com, web.archive.org (Feb. 24, 2004) <http://web.archive.org/web/20040222202831 /http://en.wikipedia.org/wikiiDocument>, Feb. 24, 2004.

Identifying, Dictionary.com, wayback.archive.org (Feb. 28, 2007) <http://wayback.archive.org/web/200501 01 OOOOOO*/http:////dictionary.reference.com//browse//identifying>, Feb. 28, 2005 <http://web.archive.org/web/20070228150533/http://dictionary.reference.com/browse/identifying>.

Koehn, P. et al, "Statistical Phrase-Based Translation," Proceedings of HLT-NAACL 2003 Main Papers , pp. 48-54 Edmonton, May-Jun. 2003.

Abney, S.P., "Stochastic Attribute Value Grammars", Association for Computational Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.

Wang, W., et al. "Capitalizing Machine Translation" in HLT-NAACL '06 Proceedings Jun. 2006. <http://www.isi.edu/natural-language/mt/hlt-naac1-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

"Abney, Steven P. , ""Parsing by Chunks,"" 1991, Principle-Based Parsing: Computation and Psycholinguistics, vol. 44,pp. 257-279."

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

"Al-Onaizan et al., ""Translating with Scarce Resources,"" 2000, 17th National Conference of the American Associationfor Artificial Intelligence, Austin, TX, pp. 672-678."

Al-Onaizan, Y. and Knight K., "Machine Transliteration of Names in Arabic Text,"Proceedings of ACL Workshop on Computational Approaches to Semitic Languages. Philadelphia, 2002.

"Al-Onaizan, Y. and Knight, K., ""Named Entity Translation: Extended Abstract"", 2002, Proceedings of HLT-02, SanDiego, CA."

"Al-Onaizan, Y. and Knight, K., ""Translating Named Entities Using Monolingual and Bilingual Resources,"" 2002, Proc. of the 40th Annual Meeting of the ACL, pp. 400-408."

"Alshawi et al., ""Learning Dependency Translation Models as Collections of Finite-State Head Transducers,"" 2000, Computational Linguistics, vol. 26, pp. 45-60."

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

"Arbabi et al., ""Algorithms for Arabic name transliteration,"" Mar. 1994, IBM Journal of Research and Development,vol. 38, Issue 2, pp. 183-194."

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

"Bangalore, S. and Rambow, O., ""Evaluation Metrics for Generation,"" 2000, Proc. of the 1st International NaturalLanguage Generation Conf., vol. 14, pp. 1-8."

"Bangalore, S. and Rambow, O., ""Using TAGs, a Tree Model, and a Language Model for Generation,"" May 2000,Workshop TAG+5, Paris."

"Bangalore, S. and Rambow, O., ""Corpus-Based Lexical Choice in Natural Language Generation,"" 2000, Proc. ofthe 38th Annual ACL, Hong Kong, pp. 464-471."

"Bangalore, S. and Rambow, O., ""Exploiting a Probabilistic Hierarchical Model for Generation,"" 2000, Proc. of 18thconf. on Computational Linguistics, vol. 1, pp. 42-48."

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

"Barnett et al., ""Knowledge and Natural Language Processing,"" Aug. 1990, Communications of the ACM, vol. 33,Issue 8, pp. 50-71."

"Baum, Leonard, ""An Inequality and Associated Maximization Technique in Statistical Estimation for ProbabilisticFunctions of Markov Processes"""", 1972, Inequalities 3:1-8."

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

"Brants, Thorsten, ""TnT—A Statistical Part-of-Speech Tagger,"" 2000, Proc. of the 6th Applied Natural LanguageProcessing Conference, Seattle."

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

"Brill, Eric. ""Transformation-Based Error-Driven Learning and Natural Language Processing: A Case Study in Partof Speech Tagging"""",1995, Computational Linguistics, vol. 21, No. 4, pp. 543-565."

"Brown et al., ""A Statistical Approach to Machine Translation,"" Jun. 1990, Computational Linguistics, vol. 16, No. 2, pp. 79-85."

Brown et al., "Word-Sense Disambiguation Using Statistical Methods," 1991, Proc. of 29th Annual ACL, pp. 264-270.

"Brown et al., ""The Mathematics of Statistical Machine Translation: Parameter Estimation,"" 1993, ComputationalLinguistics, vol. 19, Issue 2, pp. 263-311."

"Brown, Ralf, ""Automated Dictionary Extraction for ""Knowledge-Free"" Example-Based Translation,""1997, Proc. of 7th Int'l Cont. on Theoretical and Methodological Issues in MT, Santa Fe, NM, pp. 111-118."

"Callan et al., ""TREC and TIPSTER Experiments with INQUERY,"" 1994, Information Processing and Management,vol. 31, Issue 3, pp. 327-343."

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

"Carl, Michael. ""A Constructivist Approach to Machine Translation,"" 1998, New Methods of Language Processingand Computational Natural Language Learning, pp. 247-256."

"Chen, K. and Chen, H., ""Machine Translation: An Integrated Approach,"" 1995, Proc. of 6th Int'l Cont. on Theoreticaland Methodological Issue in MT, pp. 287-294."

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

"Clarkson, P. and Rosenfeld, R., ""Statistical Language Modeling Using the CMU-Cambridge Toolkit""", 1997, Proc. ESCA Eurospeech, Rhodes, Greece, pp. 2707-2710."

Cohen et al., "Spectral Bloom Filters," SIGMOD 2003, Jun. 9-12, 2003, ACM pp. 241-252.

Cohen, "Hardware-Assisted Algorithm for Full-text Large-Dictionary String Matching Using n-gram Hashing," 1998, Information Processing and Management, vol. 34, No. 4, pp. 443-464.

Cohen, Yossi, "Interpreter for FUF," (available at ftp:/lftp.cs.bgu.ac.il/ pUb/people/elhadad/fuf-life.lf).

Corston-Oliver, Simon, ""Beyond String Matching and Cue Phrases: Improving Efficiency and Coverage inDiscourse Analysis""", 1998, The AAAI Spring Symposium on Intelligent Text Summarization, pp. 9-15.

Covington, "An Algorithm to Align Words for Historical Comparison", Computational Linguistics, 1996,vol. 22, No. 4, pp. 481-496.

"Dagan, I. and Itai, A., ""Word Sense Disambiguation Using a Second Language Monolingual Corpus""", 1994, Association forComputational Linguistics, vol. 20, No. 4, pp. 563-596."

"Dempster et al., ""Maximum Likelihood from Incomplete Data via the EM Algorithm""", 1977, Journal of the RoyalStatistical Society, vol. 39, No. 1, pp. 1-38."

"Diab, M. and Finch, S., ""A Statistical Word-Level Translation Model for Comparable Corpora,""" 2000, in Proc.of theConference on Content Based Multimedia Information Access (RIAO)."

"Diab, Mona, ""An Unsupervised Method for Multilingual Word Sense Tagging Using Parallel Corpora: APreliminary Investigation""", 2000, SIGLEX Workshop on Word Senses and Multi-Linguality, pp. 1-9."

Eisner, Jason, "Learning Non-Isomorphic Tree Mappings for Machine Translation," 2003, in Proc. of the 41st Meeting of the ACL, pp. 205-208.

Elhadad et al., "Floating Constraints in Lexical Choice", 1996, ACL, vol. 23 No. 2, pp. 195-239.

"Elhadad, M. and Robin, J., ""An Overview of SURGE: a Reusable Comprehensive Syntactic RealizationComponent,""" 1996, Technical Report 96-03, Department of Mathematics and Computer Science, Ben GurionUniversity, Beer Sheva, Israel.".

Elhadad, M. and Robin, J., "Controlling Content Realization with Functional Unification Grammars", 1992, Aspects of Automated Natural Language Generation, Dale et al. (eds)., SpringerVerlag, pp. 89-104.

"Koehn, P. and Knight, K., ""Knowledge Sources for Word-Level Translation Models,""" 2001, Conference on EmpiricalMethods in Natural Language Processing."

"Kumar, R. and Li, H., ""Integer Programming Approach to Printed Circuit Board Assembly Time Optimization,""" 1995,IEEE Transactions on Components, Packaging, and Manufacturing, Part B: Advance Packaging, vol. 18,No. 4. pp. 720-727."

Kupiec, Julian, "An Algorithm for Finding Noun Phrase Correspondences in Bilingual Corpora," In Proceedings of the 31st Annual Meeting of the ACL, 1993, pp. 17-22.

"Kurohashi, S. and Nagao, M., ""Automatic Detection of Discourse Structure by Checking Surface Information inSentences,""" 1994, Proc. of COL-LING '94, vol. 2, pp. 1123-1127."

"Langkilde, I. and Knight, K., ""Generation that Exploits Corpus-Based Statistical Knowledge,""" 1998, Proc. of theCOLING-ACL, pp. 704-710."

"Langkilde, I. and Knight, K., ""The Practical Value of N-Grams in Generation,""" 1998, Proc. of the 9th InternationalNatural Language Generation Workshop, pp. 248-255."

"Langkilde, Irene, ""Forest-Based Statistical Sentence Generation,""" 2000, Proc. of the 1st Conference on NorthAmerican chapter of the ACL, Seattle, WA, pp. 170-177."

"Langkilde-Geary, Irene, ""A Foundation for General-Purpose Natural Language Generation: SentenceRealization Using Probabilistic Models of Language,""" 2002, Ph.D. Thesis, Faculty of the Graduate School, Universityof Southern California."

"Langkilde-Geary, Irene, ""An Empirical Verification of Coverage and Correctness for a General-PurposeSentence Generator,""" 1998, Proc. 2nd Int'l Natural Language Generation Conference."

"Lee, Yue-Shi,""Neural Network Approach to Adaptive Learning: with an Application to Chinese Homophone Disambiguation,""" IEEE pp. 1521-1526."

Lita, L., et al., "tRuEcasIng," Proceedings of the 41st Annual Meeting of the Assoc. for Computational Linguistics (in Hinrichs, E. and Roth, D.- editors), pp. 152-159.

Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.

"Mann, G. and Yarowsky, D., ""Multipath Translation Lexicon Induction via Bridge Languages,""" 2001, Proc. of the2nd Conference of the North American Chapter of the ACL, Pittsburgh, PA, pp. 151-158."

"Manning, C. and Schutze, H., ""Foundations of Statistical Natural Language Processing,""" 2000, The MIT Press, Cambridge, MA [Front Matter]."

"Marcu, D. and Wong, W., ""A Phrase-Based, Joint Probability Model for Statistical Machine Translation,""" 2002, Proc.of ACL-2 conference on Empirical Methods in Natural Language Processing, vol. 10, pp. 133-139."

"Marcu, Daniel, ""Building Up Rhetorical Structure Trees,""" 1996, Proc. of the National Conference on ArtificialIntelligence and Innovative Applications of Artificial Intelligence Conference, vol. 2, pp. 1069-1074."

"Marcu, Daniel, ""Discourse trees are good indicators of importance in text,""" 1999, Advances in Automatic TextSummarization, The MIT Press, Cambridge, MA."

"Marcu, Daniel, ""Instructions for Manually Annotating the Discourse Structures of Texts,""" 1999, DiscourseAnnotation, pp. 1-49."

"Marcu, Daniel, ""The Rhetorical Parsing of Natural Language Texts,""" 1997, Proceedings of ACLIEACL '97, pp. 96-103."

"Marcu, Daniel, ""The Rhetorical Parsing, Summarization, and Generation of Natural Language Texts,""" 1997, Ph.D.Thesis, Graduate Department of Computer Science, University of Toronto."

"Marcu, Daniel, ""Towards a Unified Approach to Memory- and Statistical-Based Machine Translation,""" 2001, Proc.of the 39th Annual Meeting of the ACL, pp. 378-385."

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

"Melamed, I. Dan, ""A Word-to-Word Model of Translational Equivalence,""" 1997, Proc. of the 35th Annual Meeting ofthe ACL, Madrid, Spain, pp. 490-497."

"Melamed, I. Dan, ""Automatic Evaluation and Uniform Filter Cascades for Inducing N-Best Translation Lexicons,"""1995, Proc. of the 3rd Workshop on Very Large Corpora, Boston, MA, pp. 184-198."

"Melamed, I. Dan, ""Empirical Methods for Exploiting Parallel Texts,""" 2001, MIT Press, Cambridge, MA [table ofcontents]."

"Meng et al.. ""Generating Phonetic Cognates to Handle Named Entities in English-Chinese Cross-LanguageSpoken Document Retrieval,""" 2001, IEEE Workshop on Automatic Speech Recognition and Understanding. pp. 311-314."

Metze, F. et al., "The NESPOLE! Speech-to-Speech Translation System," Proc. of the HLT 2002, 2nd Int'l. Conf. on Human Language Technology (San Francisco, CA), © 2002, pp. 378-383.

"Mikheev et al., ""Named Entity Recognition without Gazetteers,""" 1999, Proc. of European Chapter of the ACL, Bergen,Norway, pp. 1-8."

"Miike et al., ""A Full-Text Retrieval System with a Dynamic Abstract Generation Function,""" 1994, Proceedings of SI-GIR'94, pp. 152-161."

"Mohri, M. and Riley, M., ""An Efficient Algorithm for the N-Best-Strings Problem,"" 2002, Proc. of the 7th Int. Conf. onSpoken Language Processing (ICSLP'02), Denver, CO, pp. 1313-1316."

Mohri, Mehryar, "Regular Approximation of Context Free Grammars Through Transformation", 2000, pp. 251-261, "Robustness in Language and Speech Technology", Chapter 9, Kluwer Academic Publishers.

"Monasson et al., ""Determining Computational Complexity from Characteristic 'Phase Transitions',"" Jul. 1999, NatureMagazine, vol. 400, pp. 133-137."

"Mooney, Raymond, ""Comparative Experiments on Disambiguating Word Senses: An Illustration of the Role of Biasin Machine Learning,"" 1996, Proc. of the Conference on Empirical Methods in Natural Language Processing, pp. 82-91."

Nagao, K. et al., "Semantic Annotation and Transcoding: Making Web Content More Accessible," IEEE Multimedia, vol. 8, Issue 2 Apr.-Jun. 2001, pp. 69-81.

"Nederhof, M. and Satta, G., ""IDL-Expressions: A Formalism for Representing and Parsing Finite Languages inNatural Language Processing,"" 2004, Journal of Artificial Intelligence Research, vol. 21, pp. 281-287."

"Nieben, S. and Ney, H, ""Toward Hierarchical Models for Statistical Machine Translation of Inflected Languages,"" 2001,Data-Driven Machine Translation Workshop, Toulouse, France, pp. 47-54."

Norvig, Peter, "Techniques for Automatic Memoization with Applications to Context-Free Parsing", Computional Linguistics,1991, pp. 91-98, vol. 17, No. 1.

"Och et al., ""Improved Alignment Models for Statistical Machine Translation,"" 1999, Proc. of the Joint Conf. ofEmpirical Methods in Natural Language Processing and Very Large Corpora, pp. 20-28."

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc.for Computational Linguistics, Morristown, NJ, 160-167. DOI= http://dx.doi.org/10.3115/1075096.

"Och, F. and Ney, H, ""Improved Statistical Alignment Models,"" 2000, 38th Annual Meeting of the ACL, Hong Kong, pp. 440-447."

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

"Papineni et al., ""Bleu: a Method for Automatic Evaluation of Machine Translation,"" 2001, IBM Research Report, RC22176(WQ102-022)."

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

"Pla et al., ""Tagging and Chunking with Bigrams,"" 2000, Proc. of the 18th Conference on Computational Linguistics, vol. 2, pp. 614-620."

Qun, Liu, "A Chinese-English Machine Translation System Based on Micro-Engine Architecture," An Int'l. Conference on Translation and Information Technology, Hong Kong, Dec. 2000, pp. 1-10.

Rapp, Reinhard, Automatic Identification of Word Translations from Unrelated English and German Corpora, 1999, 37th Annual Meeting of the ACL, pp. 519-526.

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.

Frederking et al., "Three Heads are Better Than One," In Proceedings of the 4th Conference on Applied Natural Language Processing, Stuttgart, Germany, 1994, pp. 95-100.

Och et al., "Discriminative Training and Maximum Entropy Models for Statistical Machine Translation," In Proc. of the 40th Annual Meeting of the Association for Computational Linguistics (ACL), Philadelphia, PA, 2002.

Yasuda et al., "Automatic Machine Translation Selection Scheme to Output the Best Result," Proc of LREC, 2002, pp. 525-528.

Niessen et al, "Statistical machine translation with scarce resources using morphosyntactic information", Jun. 2004, Computational Linguistics, vol. 30, issue 2, pp. 181-204.

* cited by examiner

PROVIDING MACHINE-GENERATED TRANSLATIONS AND CORRESPONDING TRUST LEVELS

CROSS-REFERENCE TO RELATED APPLICATION

The present application is related to U.S. patent application Ser. No. 12/510,913 filed Jul. 28, 2009 and entitled "Translating Documents Based on Content," the disclosure of which is incorporated herein by reference.

BACKGROUND OF THE INVENTION

1. Field of the Invention

The present invention relates generally to natural language translation. More specifically, the present invention relates to providing machine-generated translations and corresponding trust levels.

2. Related Art

Machine translation involves use of computer systems to translate text or speech from one natural language to another. Using corpus techniques, more complex translations can be achieved relative to simple word substitution approaches. Parallel corpora or other training datasets may be used to train, or effectively 'teach,' a machine translation engine to translate between two languages, thus allowing for better handling of differences in linguistic typology, phrase recognition, translation of idioms, and isolation of anomalies.

Presently, machine-generated translations are provided without any quantified assurance of translational accuracy. Without any assurance, machine translation users may unknowingly risk sending and receiving misinformation to contacts, clients, customers, colleagues, and so forth. In order for a consumer to obtain such assurance of translation accuracy for a given machine-generated translation, the users must either possess some degree of familiarity with the source and target languages, rely on another individual with that familiarity, or obtain a human-generated translation for comparison with the machine-generated translation. In all of these cases, human expertise is necessitated. Counter to the objective of machine translation, limited supply of human expertise therefore still can hamper efficient and effective dissemination of information across language barriers.

In some machine translation systems, feedback associated with translational accuracy can be provided for improving those systems, but that feedback is not useful for machine translation users that need an indication of translational accuracy before sending or when receiving a translation. Such feedback is requested and provided subsequent to translations being provided and is often on a voluntary basis rendering availability of this feedback undependable. In addition, multiple individuals with varying levels of fluency in the pertinent languages may provide the feedback. As such, an accuracy metric or rating scale determined by multiple individuals is nearly impossible to standardize. Furthermore, feedback may not be available for some translated information due, for example, to sensitivity of that information. Therefore, there is a need for machine-generated translations to be provided concurrently with an indication of translational accuracy, without human involvement.

SUMMARY OF THE INVENTION

Embodiments of the present technology allow a machine-generated translation to be provided in conjunction with a corresponding trust level that is associated with translational accuracy of the machine-generated translation.

In one claimed embodiment, a method for training a quality-prediction engine is disclosed. The method may include translating a document in a source language to a target language by executing a machine-translation engine stored in memory to obtain a machine-generated translation. The method can further include comparing the machine-generated translation with a human-generated translation of the document. The human-generated translation is in the target language. Additionally, the method may include generating a mapping between features of the machine-generated translation and features of the human-generated translation based on the comparison. The mapping may allow determination of trust levels associated with translational accuracy of future machine-generated translations that lack corresponding human-generated translations.

Another claimed embodiment discloses a system for training a quality-prediction engine. The system may include a machine-translation engine, a feature-comparison module, and a mapping module, all of which may be stored in memory and executed by a processor to effectuate the respective functionalities attributed thereto. The machine-translation engine may be executed to translate a document in a source language to a target language to obtain a machine-generated translation. The feature-comparison module may be executed to compare the machine-generated translation with a human-generated translation of the document. The human-generated translation is in the target language. The mapping module can be executed to generate a mapping between features of the machine-generated translation and features of the human-generated translation based on the comparison. The mapping may allow determination of trust levels associated with translational accuracy of future machine-generated translations that lack corresponding human-generated translations.

A computer readable storage medium having a program embodied thereon is also disclosed as a claimed embodiment. The program is executable by a processor to perform a method for training a quality-prediction engine. The method may include translating a document in a source language to a target language using a machine-translation engine to obtain a machine-generated translation, comparing the machine-generated translation with a human-generated translation of the document, and generating a mapping between features of the machine-generated translation and features of the human-generated translation based on the comparison. The human-generated translation is in the target language. The mapping allows determination of trust levels associated with translational accuracy of future machine-generated translations that lack corresponding human-generated translations.

In yet another claimed embodiment, a method for credibly providing machine-generated translations is disclosed. The method can include translating a document from a source language to a target language by executing a machine-translation engine stored in memory to obtain a machine-generated translation, predicting a trust level of the machine-generated translation by executing a quality-prediction engine stored in memory, and outputting the machine-generated translation and the trust level. The trust level is associated with translational accuracy of the machine-generated translation.

A further claimed embodiment discloses a system for credibly providing machine-generated translations. The system may include a machine-translation engine, a communications engine, and a quality-prediction engine, all of which can be stored in memory and executed by a processor to effectuate the respective functionalities attributed thereto. The machine-translation engine can be executed to translate a document from a source language to a target language to obtain a machine-generated translation. The quality-prediction engine can be executed to predict a trust level of the machine-generated translation. The trust level is associated with translational accuracy of the machine-generated translation. The communications engine may be executed to output the machine-generated translation and the trust level. The communications engine may be communicatively coupled with the machine-translation engine and the quality-prediction engine.

Still another claimed embodiment discloses a computer readable storage medium having a program embodied thereon. The program is executable by process to perform a method for credibly providing machine-generated translations. The method may include translating a document from a source language to a target language using a machine-translation engine to obtain a machine-generated translation, predicting a trust level of the machine-generated translation using a quality-prediction engine, and outputting the machine-generated translation and the trust level. The trust level is associated with translational accuracy of the machine-generated translation.

DETAILED DESCRIPTION OF EXEMPLARY EMBODIMENTS

The present technology allows a trust level to be predicted for machine-generated translations. More specifically, given a machine-generated translation in a target language of a document in source language, a trust level associated with translational accuracy can be predicted and provided along with the machine-generated translation. Such a document can include any amount of text ranging, for example, from a few words to a batch of textual items such as websites, books, articles, or letters. The trust level may be presented in a number of manners such as on a scale between one and five, or a star rating scale. The trust level can be predicted without a human-generated translation of the document or any other human intervention. Since both the machine-generated translation and the corresponding trust-level prediction can be provided contemporaneously, it is immediately conveyed how much trust can be placed in the machine-generated translation without an understanding of the source language and/or the target language being necessary. Trust-level predictions can be provided in real-time and as a batch when several documents are processed together.

It is noteworthy that machine-generated translations obtained by way of statistical-translation techniques and non-statistical-translation techniques fall within the scope of the present technology. Furthermore, while the present technology is described herein in the context of textual translations, the principles disclosed can likewise be applied to speech translations such as when employed in conjunction with speech recognition technologies.

Figure 1:
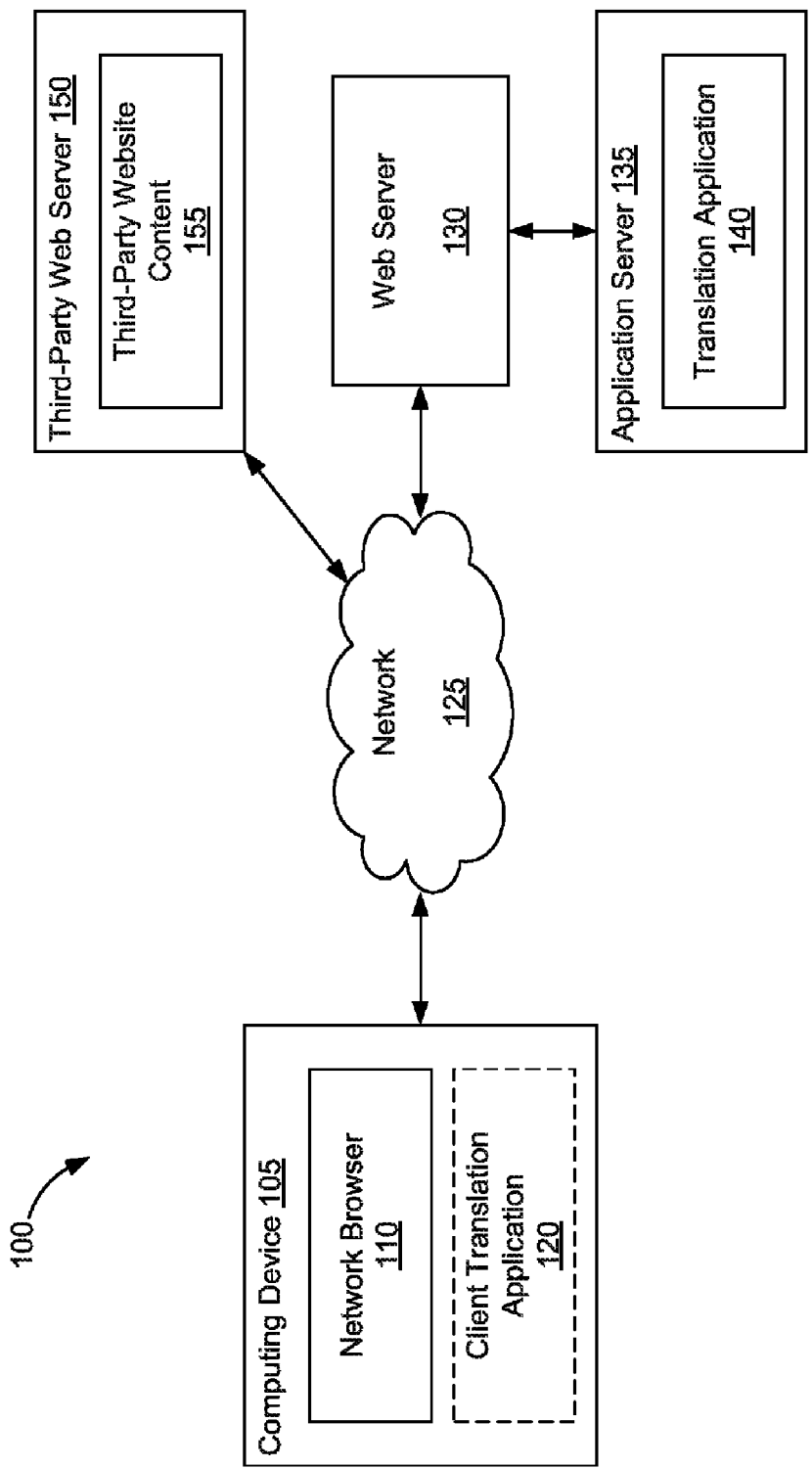
FIG. 1 is a block diagram of an exemplary environment for practicing embodiments of the present technology.

Referring now to FIG. 1, a block diagram of an exemplary environment 100 is shown in which embodiments of the present technology can be practiced. As depicted, the environment 100 includes a computing device 105 providing a network browser 110 and optionally a client translation application 120, a web server 130, an application server 135 providing a translation application 140, and a third-party web server 150 providing third-party website content 155. Communication between the computing device 105, the web server 130, and the third-party web server 150 is provided by a network 125. Examples of the network 125 include a wide area network (WAN), local area network (LAN), the Internet, an intranet, a public network, a private network, a combination of these, or some other data transfer network. Examples of the computing device 105 include a desktop personal computer (PC), a laptop PC, a pocket PC, a personal digital assistant (PDA), a smart phone, a cellular phone, a portable translation device, and so on. The web server 130, the application server 135, and the third-party web server 150 may each be implemented as one or more servers. An exemplary computing system for implementing the computing device 105, the web server 130, the application server 135, and the third-party web server 150 is described in further detail in connection with FIG. 6. Additionally, other various components (not depicted) that are not necessary for describing the present technology may also be included in the environment 100, in accordance with exemplary embodiments.

As mentioned, the computing device 105 may include the network browser 110. The network browser 110 may retrieve, present, traverse, and otherwise process information located on a network, including content pages. For example, network browser 110 can be implemented as a web browser that can process a content page in the form of a web page. The network browser 110 may provide an interface as part of a content page or web page. The interface can be implemented from content page data received from the third-party web server 150 or the web server 130. Via the interface, the computing device 105 can receive an indication from a user to provide a translation from a source language to a target language along with a trust-level prediction of that translation. The user may provide the indication via the document itself, location data for the document such as a link (e.g., URL) associated with the document, or other information. The indication may convey a desire to obtain a highly accurate translation based on content included in or associated with the document. The indication may be forwarded either to the third-party website or the web server 130 via the network 125.

The computing device 105, as depicted in FIG. 1, can include the client translation application 120. The client translation application 120 may be a stand-alone executable application residing and executing, at least in part, on the computing device 105. The client translation application 120 may also provide an interface for selecting content to have translated. The client translation application 120 may communicate directly with the web server 130, the application server 135, or the third-party web server 150. In the description herein, it is intended that any functionality performed translation application 140, including providing an interface for implementing various functionality, can also be implanted by the client translation application 120. In some embodiments, client translation application 120 may be implemented in place of translation application 140, which is indicated by the dashed lines comprising the client translation application 120 in FIG. 1.

The web server 130 may communicate both with the application server 135 and over the network 125, for example to provide content page data to the computing device 105 for rendering in the network browser 110. The content page data may be used by the network browser 110 to provide an interface for selecting an indication of a document to translate, whether stored over a network or locally to the computing device 105. The web server 130 can also receive data associated with an indication from the computing device 105. The web server 130 may process the received indication and/or provide the indication, and optionally any document data, to the application server 135 for processing by translation application 140.

The application server 135 communicates with web server 130 and other applications, for example the client translation applications 120, and includes the translation application 140. The translation application 140 can generate a translated version of a document and a trust-level prediction associated therewith, as discussed in further detail herein. The translated document and the trust-level prediction may be transmitted to a user over the network 125 by the application server 135 and the web server 130, for example, through the computing device 105.

The translation application 140 may be part of a translation system that translates documents and predicts a trust level corresponding to the translated documents. A trust level may be presented on a numeric scale (e.g., 1 through 5), a term-based scale (e.g., poor through excellent), a star-rating scale (e.g., one star through five stars), and so forth. Generally speaking, the translation application 140 receives an indication, such as via the network browser 110, to translate a document from a source language to a target language and to provide a quality prediction. The translation application 140 then accesses the document and translates the document by way of executing a machine-translation engine. Based on the translated document and other information discussed herein, the translation application 140 predicts a trust level associated with the translational accuracy of the translated document. The translation and the trust level returned to the user such as via the computing device 105. The translation application 140 is described in further detail in connection with FIG. 2. Furthermore, although the translation application 140 is depicted as being a single component of the environment 100, it is noteworthy that the translation application 140 and constituent elements thereof may be distributed across several computing devices that operate in concert via the network 125.

In some embodiments, a content page for allowing a user to configure translation parameters can be provided through the network browser 110. The translation configuration content page data can be provided to the network browser 110 by the web server 130 and/or by the third-party web server 150. When provided by the third-party web server 150, the third-party web server 150 may access and retrieve information from the translation system (i.e., the web server 130 and/or the application server 135) to provide a content page having an interface for configuring. In exemplary embodiments, the translation application 140 is accessed by the third-party web server 150. A graphical user interface (GUI) may be implemented within a content page by the third-party web server 150, rendered in the network browser 110, and accessed by a user via the network browser 110 of the computing device 105. According to exemplary embodiments, the GUI can enable a user to identify a document to be translated and select various options related to translating the documents.

According to some exemplary embodiments, the third-party web server 150 may not necessarily provide a translation configuration content page but, instead, may provide content pages containing text. As such, a content page provided by the third-party web server 150 may itself comprise a document to be translated. That is, a user may view a webpage in a source language (e.g., English or French) through the network browser 110 from a content page received from the third-party web server 150. The user may provide input to subsequently view the webpage in a different language (e.g., Spanish). The translation application 140 may access and translate the text provided within the content page, predict a trust level of the translation, and return a translated version and trust-level prediction to the network browser110 or the third-party web server 150 in accordance with embodiments of the present technology.

Figure 2:
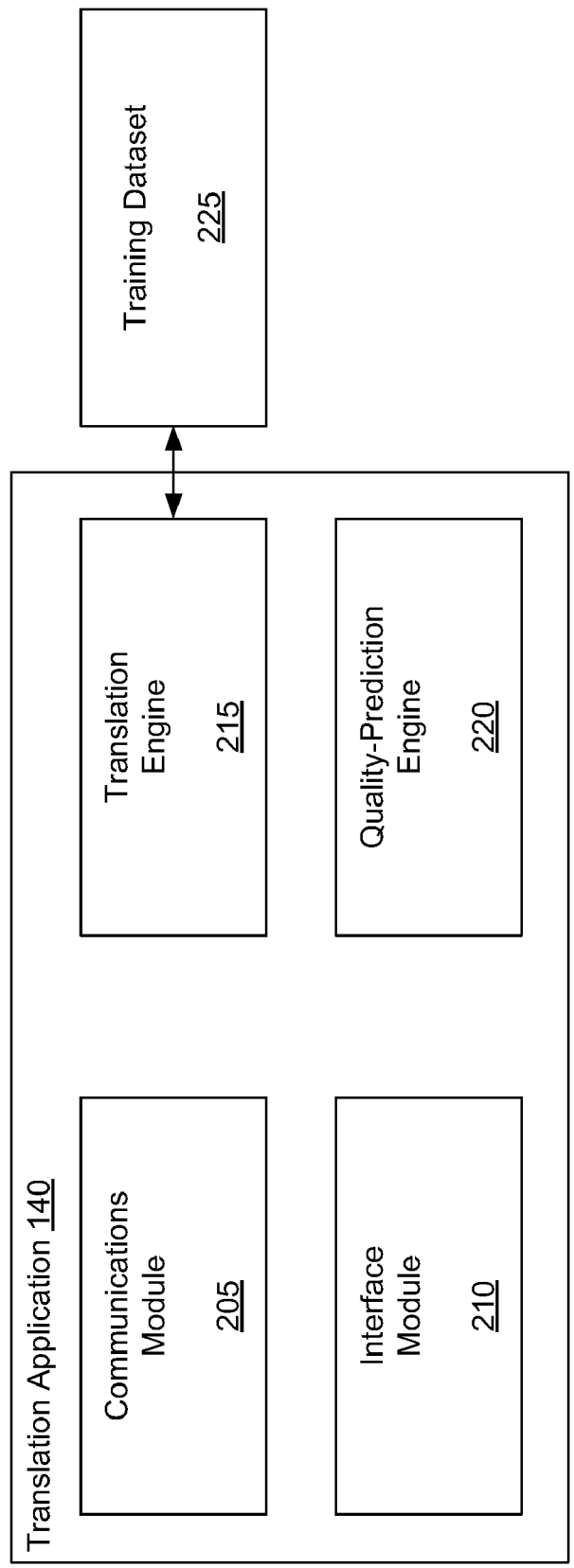
FIG. 2 is a block diagram of an exemplary translation application invoked in the environment depicted in FIG. 1.

FIG. 2 is a block diagram of an exemplary translation application 140 invoked in the environment 100. The translation application 140, as depicted, includes a communications module 205, an interface module 210, a translation engine 215, and a quality-prediction engine 220. Although FIG. 2 depicts one translation engine 215, the translation application 140 may comprise any number of translation engines and may be in communication with other translation engines via the network 125. The translation engine 215 is associated with the training dataset 225. The training dataset 225 may or may not be included in the translation application 140. Programs comprising engines and modules of the translation application 140 may be stored in memory of a computing system such as the computing device 105, the web server 130, the application server 135, the third-party web server 150, or any computing device that includes the translation application 140. Additionally, the constituent engines and modules can be executed by a processor of a computing system to effectuate respective functionalities attributed thereto. It is noteworthy that the translation application 140 can be composed of more or fewer modules and engines (or combinations of the same) and still fall within the scope of the present technology. For example, the functionalities of the communications module 205 and the functionalities of the interface module 210 may be combined into a single module or engine.

When executed, the communications module 205 allows an indication to be received via a user interface to provide a translation of a document from a source language to a target language, as well as a prediction of a trust level of the translation. Such a user interface may include the network browser 110 or a GUI provided by the third-party website content 155. The communications module 205 may also facilitate accessing the document to be translated such as in response to an indication by a user. The document can be accessed based on location information associated with the document. Additionally, the document can be downloaded from the computing device 105, third-party web server 150, or any other site or device accessible via the network 125. Furthermore, the communications module 205 can be executed such that a translated document and an associated trust level are outputted from the translation application 140 to devices accessible via the network 125 (e.g., the computing device 105).

The interface module 210 can be executed to provide a graphical user interface through network browser 110, for example as a content page, that enables a user to request the translation and corresponding trust-level prediction. The graphical user interface may also provide various options to a user relating to, for example, pricing or translation domain. According to various embodiments, the graphical user interface may be presented to a user as a content page for network browser 110 via the third-party web server 150 or directly by client translation application 120 at the computing device 105.

The translation engine 215 comprises a machine translation engine capable of translating from a source language to a target language. Such translation capability may result from training the translation engine 215 on various training data. Higher translation accuracy may be achieved for domain-specific translations when a machine translation engine is trained using a training dataset associated with the same domain or similar subject matter as documents being translated. For example, a translation of a car-repair manual may be of higher quality if the machine translation engine employed was trained using a car-repair-domain-specific training dataset compared to, say, a general training dataset or an unrelated-domain-specific training dataset. In some embodiments, the translation application 140 may include more than one translation engine 215. Additionally, the translation engine 215 may be based on statistical-translation techniques, non-statistical-translation techniques, or a combination thereof.

As depicted in FIG. 2, the translation engine 215 is associated with the training dataset 225. According to other exemplary embodiments, the translation engine 215 can be associated with any number of training datasets. The training dataset 225 may comprise documents in source languages and corresponding translations of those documents in target languages (i.e., parallel corpora). The translated documents may be human-generated or machine-generated. The training dataset 225 may be domain-specific or generic. Accordingly, the translation engine 215 may be associated with specific subject matter. For example, the translation engine 215 may be associated with consumer electronics or with agriculture.

According to exemplary embodiments, the quality-prediction engine 220 is executable to predict a trust level of a translation provided by the translation engine 215. The trust-level prediction is indicative of translational accuracy of translations generated by the translation engine 215. The trust level is predicted independent of a human-generated translation or other human intervention. The quality-prediction engine 220 is described in further detail in connection with FIG. 3.

Figure 3:
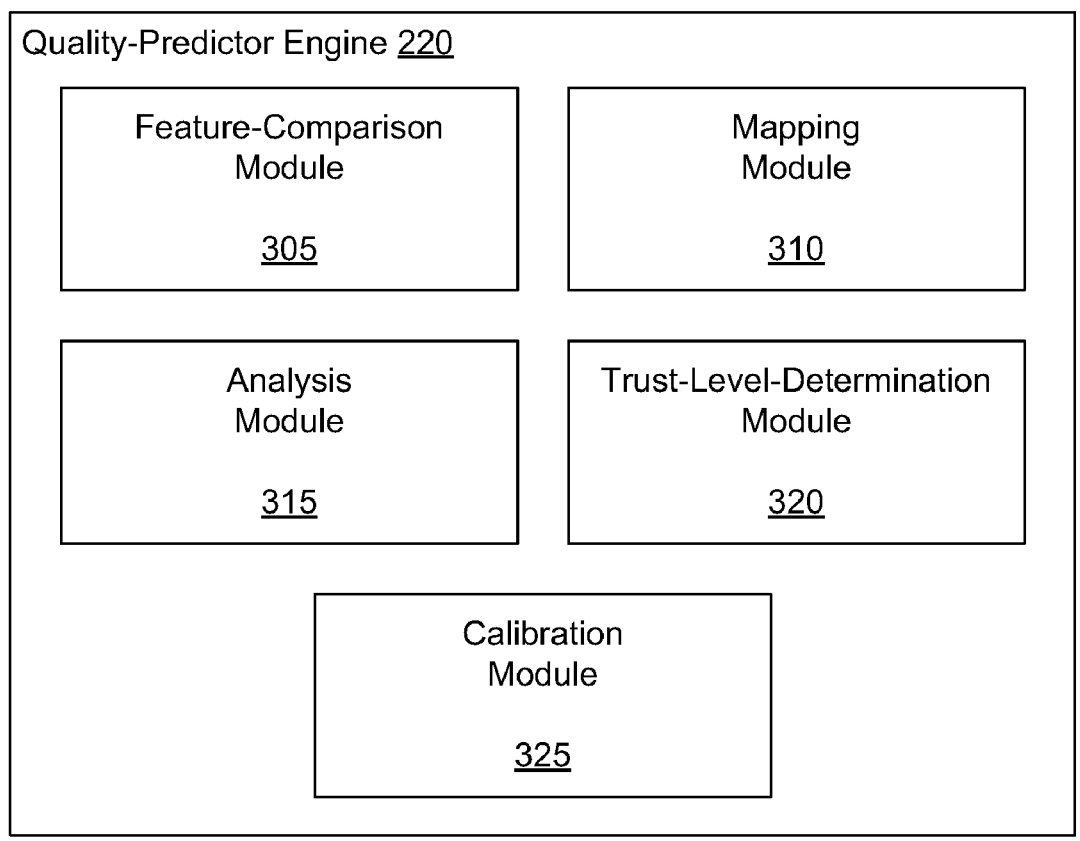
FIG. 3 is a block diagram of an exemplary quality-prediction engine included in the translation application.

FIG. 3 is a block diagram of an exemplary quality-prediction engine 220 included in the translation application 140. The quality-prediction engine 220 provides a trust-level prediction of a translation generated through execution of the translation engine 215. The depicted quality-prediction engine 220 includes a feature-comparison module 305, a mapping module 310, an analysis module 315, a trust-level-determination module 320, and a calibration module 325, all of which may be stored in memory and executed by a processor to effectuate the functionalities attributed thereto. Furthermore, the quality-prediction engine 220 can be composed of more or fewer modules (or combinations of the same) and still fall within the scope of the present technology. For example, the functionalities of the feature-comparison module 305 and the functionalities of the mapping module 310 may be combined into a single module or engine.

Some modules included in the quality-prediction engine 220 may be used primarily during training of the quality-prediction engine 220, while other modules may be used primarily when the quality-prediction engine 220 is utilized to provide credibility for machine-generated translations. During training, the quality-prediction engine 220, in effect, learns to predict translational accuracy. In general terms, this learning process can be achieved using several parallel corpora, namely a source-language corpus, a human-generated translation of the source-language corpus (i.e., a human-generated target-language corpus), and a machine-generated translation of the source-language corpus (i.e., a machine-generated target-language corpus). These corpora may reside in the training dataset 225. By forming a comparison, relative to the source-language corpus, between the human-generated target-language corpus and the machine-generated target-language corpus, the quality-prediction engine 220 can learn aspects of accurate and inaccurate translation by the translation engine 215.

According to exemplary embodiments, two or more machine-generated translations of the source-language corpus may be utilized. These two or more machine-generated translations may be obtained from two or more corresponding translation engines 215, which may each be based on different translation techniques or similar translation techniques using different translation algorithms. One of these translation engines 215 is a primary engine that generates final translations outputted to a user. One or more other translation engines 215 are secondary engines used for during training and trust-level prediction.

The feature-comparison module 305 can be executed to compare a machine-generated target-language corpus with a human-generated target-language corpus, relative to a corresponding source-language corpus. This comparison can be used in mapping features such as similarities and differences between the machine-generated target-language corpus and the human-generated target-language corpus. Another feature may be the length of input text segments. A metric referred to herein as perplexity may also be invoked as a feature. Perplexity describes the likelihood that an output string would occur in a target language. For example, if English were the target language, the string "red car" would have a lower perplexity than the string "car red," wherein lower perplexity is more desirable than higher perplexity. In embodiments having more than one translation engine 215, an exemplary feature may be a correlation between translations generated by a primary engine and a secondary engine relative to a correlation between translations generated by a primary engine and a human.

Execution of the mapping module 310 allows generation of a mapping between features of the machine-generated target-language corpus and features of the human-generated target-language corpus based on the comparison obtained through execution of the feature-comparison module 305. This mapping allows determination of trust levels associated with translational accuracy of future machine-generated translations that lack corresponding human-generated translations. More specifically, the quality-prediction engine 220 can use this mapping learned from the parallel corpora comparison, when human-generated translations are not available, to make a prediction as to how close a machine-generated translation is to what a human translator might generate. This prediction can be expressed in many manners such as a percentile or scaled value.

When the quality-prediction engine 220 is utilized to provide credibility for machine-generated translations, the analysis module 315 is executed to analyze discrete units of a machine-generated translation obtained from the translation engine 215 to determine a trust level or a trust value for each discrete unit. The discrete units may comprise words, phrases, sentences, paragraphs, pages, and so forth. The trust value may be associated with translation accuracy, which in turn may represent an alignment-estimation between the machine-generated translation and a prospective human-generated translation for the same source-language document. Trust values for discrete units can allow weak points in machine-generated translations to be identified. In some cases, such as when a trust value for a discrete unit falls below a threshold value, a human translator or another translation engine 215 may be invoked to retranslate or otherwise improve that discrete unit to elevate the associated trust value.

In embodiments having more than one translation engine 215, the analysis module 315 may also consider a correlation between a translation generated by a primary engine and a translation generated by a secondary engine in determining a trust level or a trust value for each discrete unit. To illustrate, say there is a high correlation between translations generated by a primary engine and a secondary engine during training when there is also a high correlation between translations generated by the primary engine and a human. While providing machine-generated translations, when no human-generated translations are available, a high correlation between translations generated by a primary engine and a secondary engine may be assumed to indicate a high trust level or trust value.

The trust-level-determination module 320 may be executed to obtain the trust level for the machine-generated translation by combining the trust values of each discrete unit analyzed by the analysis module 315. The trust values can be combined using a weighted average, for example. According to exemplary embodiments, a contribution of each trust value to the weighted average is associated with the length of the respective discrete unit. When the machine-generated translation includes a batch of documents, an aggregate trust level indicative of the overall translational accuracy of the batch may also be obtained by way of execution of the trust-level-determination module 320.

Execution of the calibration module 325 allows calibration of the quality-prediction engine 220. Calibration of the quality-prediction engine 220 may be desirable for a number of reasons. For example, in some domains such as legal writing, precision is of great importance so the quality-prediction engine 220 may overestimate the trust level compared to what a human translator might suggest. Conversely, in domains such as internet chat where form is secondary to conveying concepts, the quality-prediction engine 220 may underestimate the trust level compared to what a human translator might suggest. In exemplary embodiments, the calibration module 325 uses ratings provided by third-party sources of samples of translations generated by the translation engine 215 to adjust or tune the scale used for the trust levels determined by the trust-level-determination module 320. Such third-party sources may include human translators. Additionally, adjustments to a trust-level scale can be linear or non-linear.

In some instances, content can shift such as in documents that are continuously updated. To ensure that translations and corresponding trust levels remain dependable, feedback may be provided by users. This feedback may be obtained from the interface module 210. In one example, a user can provide feedback through a widget presented on a website or elsewhere. By obtaining feedback from users, the calibration module 325 can be automatically triggered to perform further calibrations ensuring that the calibration of the quality-prediction engine 220 remains consistent with user feedback.

Figure 4:
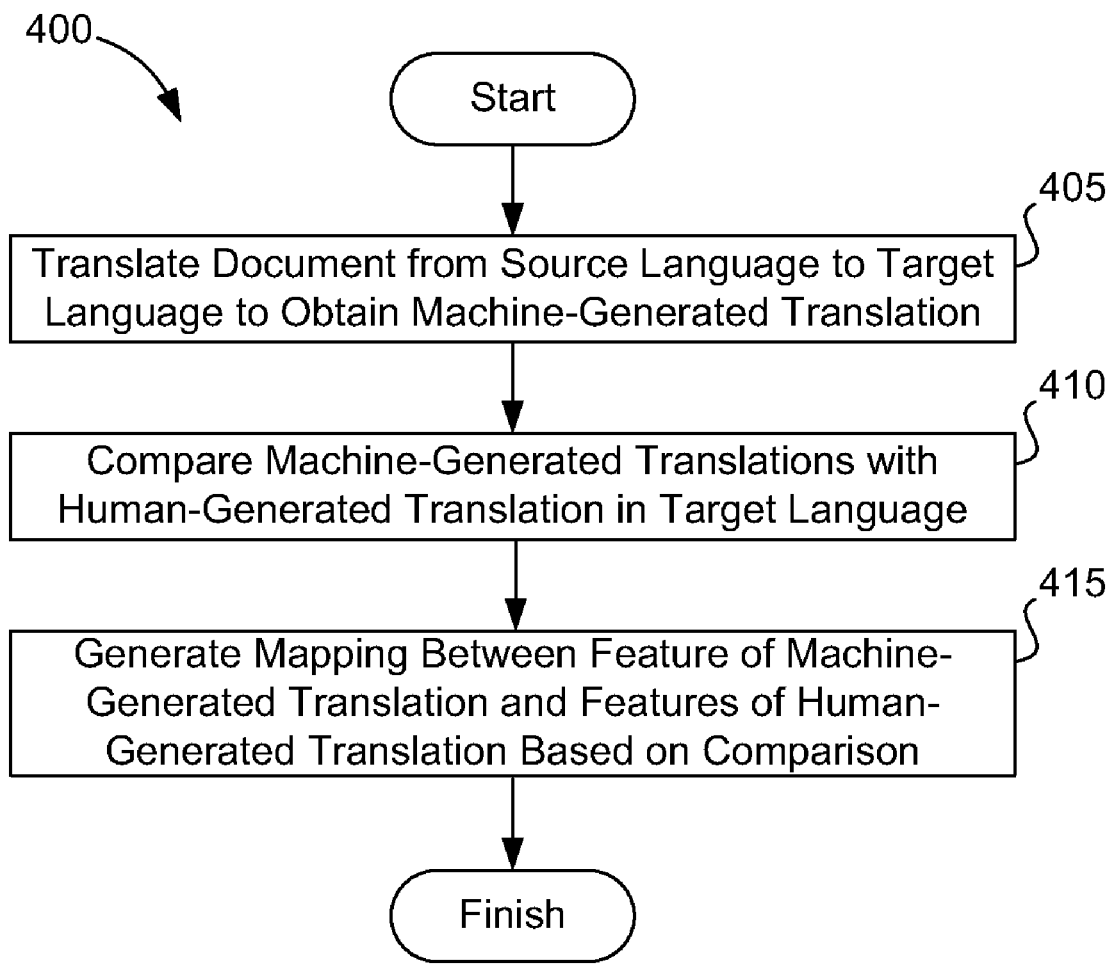
FIG. 4 is a flowchart of an exemplary method for training a quality-prediction engine.

FIG. 4 is a flowchart of an exemplary method 400 for training a quality-prediction engine (e.g., the quality-prediction engine 220). The steps of the method 400 may be performed in varying orders. Additionally, steps may be added or subtracted from the method 400 and still fall within the scope of the present technology.

In step 405, a document in a source language is translated to a target language to obtain a machine-generated translation. Step 405 may be performed by executing a machine-translation engine (e.g., the translation engine 215) stored in memory.

In step 410, the machine-generated translation is compared with a human-generated translation of the document. The human-generated translation is also in the target language.

In step 415, a mapping between features of the machine-generated translation and features of the human-generated translation is generated. The mapping can be generated based on comparison of step 410. In addition, the mapping allows determination of trust levels, which as associated with translational accuracy, of future machine-generated translation that lack corresponding human-generated translations.

Figure 5:
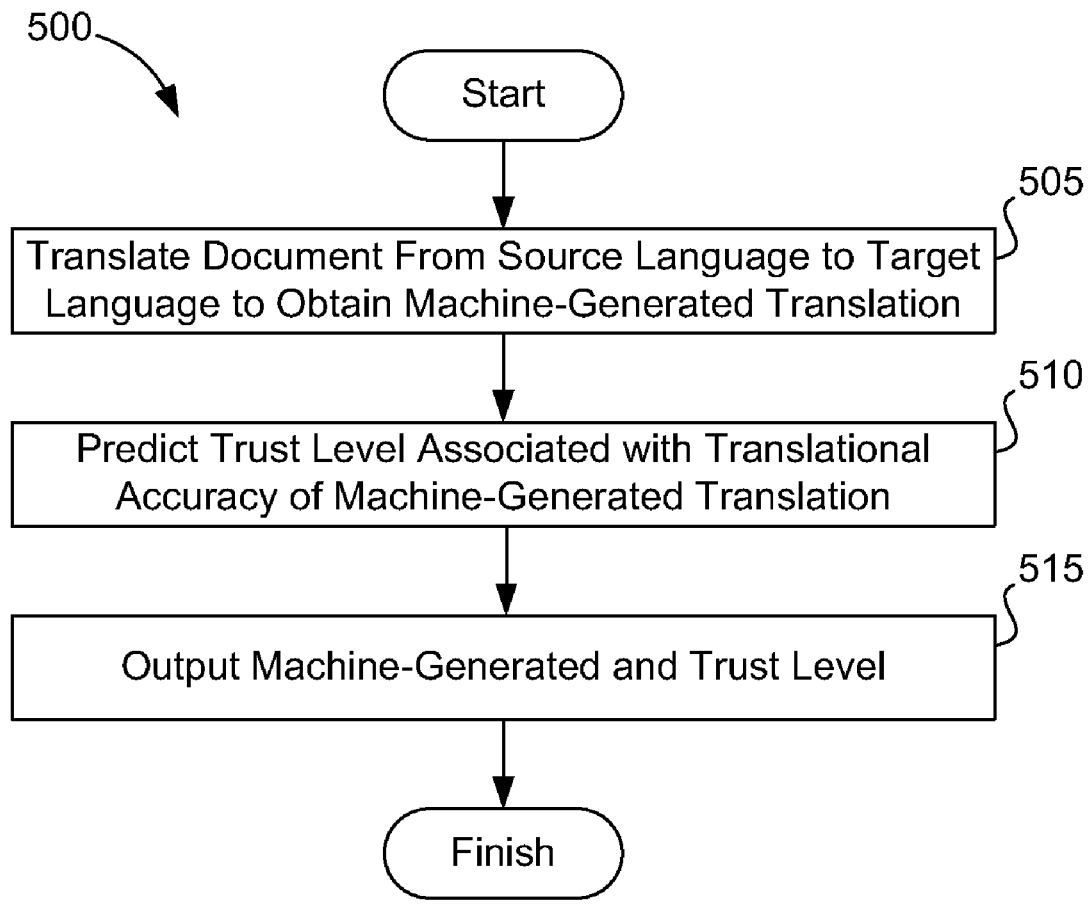
FIG. 5 is a flowchart of an exemplary method for credibly providing machine-generated translations.

FIG. 5 is a flowchart of an exemplary method 500 for credibly providing machine-generated translations. The steps of the method 500 may be performed in varying orders. Additionally, steps may be added or subtracted from the method 500 and still fall within the scope of the present technology.

In step 505, a document is translated from a source language to a target language to obtain a machine-generated translation. Step 505 may be performed by executing a machine-translation engine (e.g., the translation engine 215) stored in memory.

In step 510, a trust level of the machine-generated translation is predicted. Such a trust-level prediction is associated with translational accuracy of the machine-generated translation. The trust-level prediction may be obtained through execution of a quality-prediction engine (e.g., the quality-prediction engine 220) stored in memory.

In step 515, the machine-generated translation and the trust level are outputted. According to exemplary embodiments, the machine-generated translation and the trust level are outputted to a user via a computing device such as computing device 105.

Figure 6:
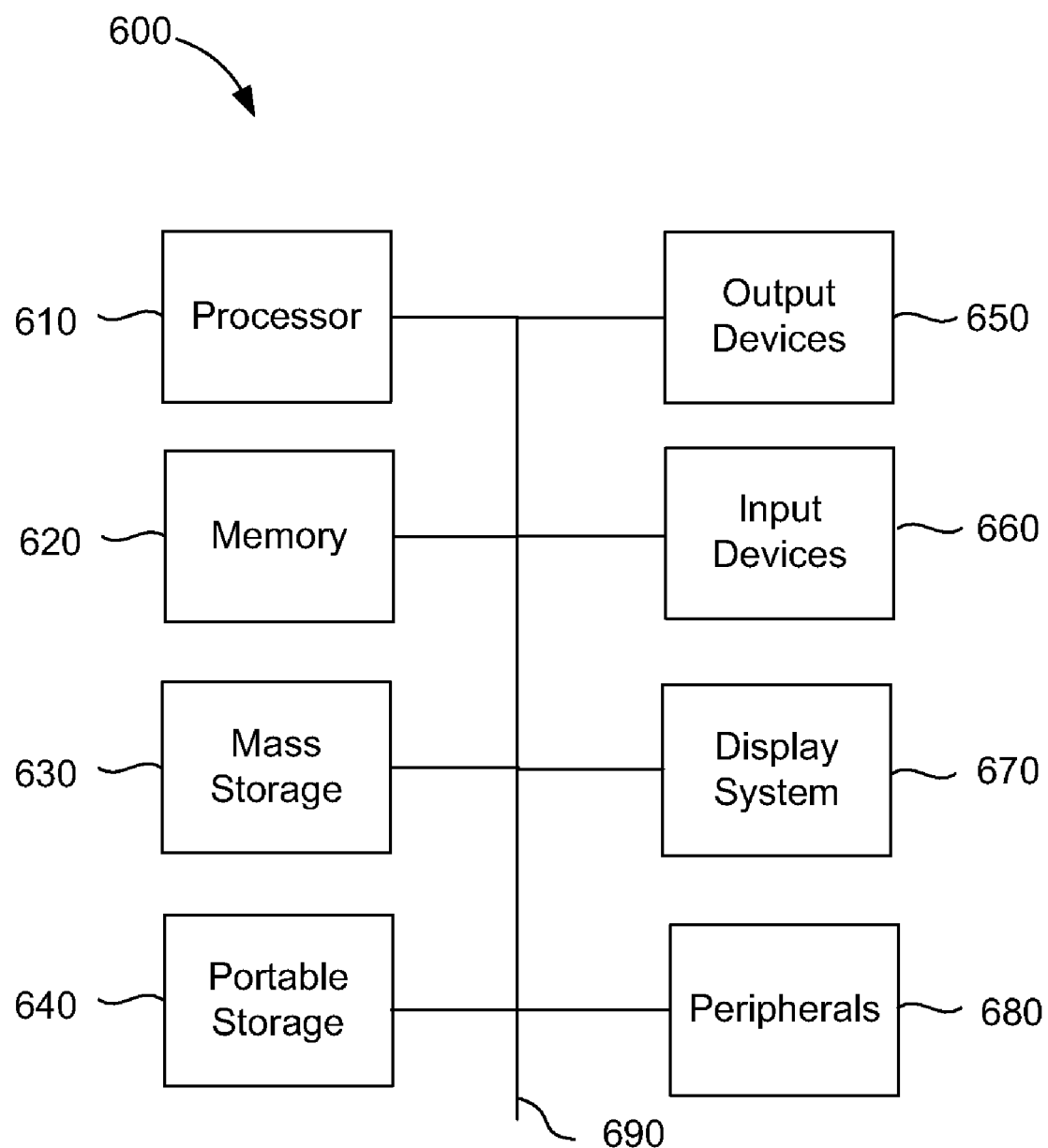
FIG. 6 illustrates an exemplary computing system that may be used to implement an embodiment of the present technology.

FIG. 6 illustrates an exemplary computing system 600 that may be used to implement an embodiment of the present technology. The computing system 600 may be implemented in the contexts of the likes of the computing device 105, a server implementing the third-party website, and a server implementing the translation application 140. The computing system 600 includes one or more processors 610 and main memory 620. Main memory 620 stores, in part, instructions and data for execution by processor 610. Main memory 620 can store the executable code when in operation. The computing system 600 further includes a mass storage device 630, a portable storage device 640, output devices 650, user input devices 660, a display system 670, and peripheral device(s) 680.

The components shown in FIG. 6 are depicted as being connected via a single bus 690. The components may be connected through one or more data transport means. The processor 610 and the main memory 620 may be connected via a local microprocessor bus, and the mass storage device 630, the peripheral devices 680, the portable storage device 640, and display system 670 may be connected via one or more input/output (I/O) buses.

The mass storage device 630, which may be implemented with a magnetic disk drive or an optical disk drive, is a non-volatile storage device for storing data and instructions for use by the processor 610. The mass storage device 630 can store the system software for implementing embodiments of the present invention for purposes of loading that software into the main memory 620.

The portable storage device 640 operates in conjunction with a portable non-volatile storage medium, such as a floppy disk, compact disk, digital video disc, or USB storage device, to input and output data and code to and from the computer system 600 of FIG. 6. The system software for implementing embodiments of the present invention may be stored on such a portable medium and input to the computer system 600 via the portable storage device 640.

The input devices 660 provide a portion of a user interface. The input devices 660 may include an alpha-numeric keypad, such as a keyboard, for inputting alpha-numeric and other information, or a pointing device, such as a mouse, a trackball, stylus, or cursor direction keys. Additionally, the computing system 600 as shown in FIG. 6 includes the output devices 650. Suitable output devices include speakers, printers, network interfaces, and monitors.

The display system 670 may include a liquid crystal display (LCD) or other suitable display device. The display system 670 receives textual and graphical information, and processes the information for output to the display device.

The peripheral device(s) 680 may include any type of computer support device to add additional functionality to the computer system. The peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for training a quality-prediction engine, the method comprising:
translating a document in a source language to a target language by executing a machine-translation engine stored in memory to obtain a machine-generated translation;
comparing the machine-generated translation with a human-generated translation of the document, the human-generated translation in the target language;
generating a mapping between features of the machine-generated translation and features of the human-generated translation based on the comparison, the mapping allowing determination of trust levels associated with translational accuracy of future machine-generated translations that lack corresponding human-generated translations; and
calibrating the quality prediction engine, wherein calibrating the quality-prediction engine includes:
obtaining a plurality of opinions for a plurality of sample translations generated by execution of the machine-translation engine, each of the opinions from a human and indicating a perceived trust level of corresponding sample translations;
using the quality-prediction engine to determine a trust level of each of the plurality of sample translations;
determining a relationship between the plurality of opinions and the trust levels of the plurality of sample translations; and
tuning the mapping to minimize any difference between the plurality of opinions and the trust levels of the plurality of sample translations.

2. The method of claim 1, wherein the translational accuracy represents an alignment-estimation between the machine-generated translation and a prospective human-generated translation.

3. The method of claim 1, wherein the trust level of each of the plurality of sample translations is indicated as one of a numerical scale, a term based scale, a star-rating scale, or an analog scale.

4. The method of claim 1, wherein determining the trust level of each of the plurality of sample translations includes analyzing discrete units of the plurality of sample translations to determine a trust level for each discrete unit.

5. The method of claim 4, wherein a discrete unit comprises one of a sentence, a word, a phrase, or a paragraph.

6. The method of claim 1, wherein the quality-prediction engine overestimates the trust level of the plurality of sample translations.

7. The method of claim 1, wherein the quality-prediction engine underestimates the trust level of the plurality of sample translations.

8. A method for training a quality-prediction engine, the method comprising:
translating a document in a source language to a target language by executing a machine-translation engine stored in memory to obtain a machine-generated translation;
comparing the machine-generated translation with a human-generated translation of the document, the human-generated translation in the target language;

generating a mapping between features of the machine-generated translation and features of the human-generated translation based on the comparison, the mapping allowing determination of trust levels associated with translational accuracy of future machine-generated translations that lack corresponding human-generated translations; and calibrating the quality prediction engine, wherein calibrating the quality prediction engine includes:

obtaining a plurality of opinions for a plurality of sample translations generated by execution of the machine-translation engine, each of the opinions from a human and indicating a perceived trust level of corresponding sample translations;

using the quality-prediction engine to determine a trust level of each of the plurality of sample translations;

determining a relationship between the plurality of opinions and the trust levels of the plurality of sample translations; and tuning the mapping to minimize any difference between the plurality of opinions and the trust levels of the plurality of sample translations, and wherein calibrating the quality-prediction engine is automatically triggered to ensure that determined trust levels are continually consistent with user feedback.

9. The method of claim 8, wherein calibrating the quality-prediction engine includes obtaining user feedback.

10. A system for training a quality-prediction engine, the system comprising:

a processor;

a machine-translation engine stored in memory and executable by a processor to translate a document in a source language to a target language to obtain a machine-generated translation;

a feature-comparison module stored in memory and executable by a processor to compare the machine-generated translation with a human-generated translation of the document, the human-generated translation in the target language;

a mapping module stored in memory and executable by a processor to generate a mapping between features of the machine-generated translation and features of the human-generated translation based on the comparison, the mapping allowing determination of trust levels associated with translational accuracy of future machine-generated translations that lack corresponding human-generated translations; and a calibration module stored in memory and executable by a processor to calibrate the quality-prediction engine;

wherein the calibration module:

obtains a plurality of opinions for a plurality of sample translations generated by execution of the machine-translation engine, each of the opinions from a human and indicating a perceived trust level of corresponding sample translations;

uses the quality-prediction engine to determine a trust level of each of the plurality of sample translations;

determines a relationship between the plurality of opinions and the trust levels of the plurality of sample translations; and tunes the mapping to minimize any difference between the plurality of opinions and the trust levels of the plurality of sample translations.

11. The system of claim 10, wherein the translational accuracy represents an alignment-estimation between the machine-generated translation and a prospective human-generated translation.

12. The system of claim 10, wherein the quality-prediction engine indicates the trust level of each of the plurality of sample translations as one of a numerical scale, a term based scale, a star-rating scale, or an analog scale.

13. The system of claim 10, wherein the quality prediction engine includes an analysis module stored in memory and executable by a processor to analyze discrete units of the plurality of sample translations to determine a trust level for each discrete unit.

14. The system of claim 13, wherein a discrete unit comprises one of a sentence, a word, a phrase, or a paragraph.

15. The system of claim 10, wherein the quality-prediction engine overestimates the trust level of the plurality of sample translations.

16. The system of claim 10, wherein the quality-prediction engine underestimates the trust level of the plurality of sample translations.

17. A system for training a quality-prediction engine, the system comprising:

a processor;

a machine-translation engine stored in memory and executable by a processor to translate a document in a source language to a target language to obtain a machine-generated translation;

a feature-comparison module stored in memory and executable by a processor to compare the machine-generated translation with a human-generated translation of the document, the human-generated translation in the target language;

a mapping module stored in memory and executable by a processor to generate a mapping between features of the machine-generated translation and features of the human-generated translation based on the comparison, the mapping allowing determination of trust levels associated with translational accuracy of future machine-generated translations that lack corresponding human-generated translations; and a calibration module stored in memory and executable by a processor to calibrate the quality-prediction engine;

wherein the calibration module:

obtains a plurality of opinions for a plurality of sample translations generated by execution of the machine-translation engine, each of the opinions from a human and indicating a perceived trust level of corresponding sample translations;

uses the quality-prediction engine to determine a trust level of each of the plurality of sample translations;

determines a relationship between the plurality of opinions and the trust levels of the plurality of sample translations; and tunes the mapping to minimize any difference between the plurality of opinions and the trust levels of the plurality of sample translations;

wherein the quality-prediction engine is automatically calibrated to ensure that determined trust levels are continually consistent with user feedback.

18. The system of claim 17, further comprising an interface module stored in memory and executable by a processor to obtain user feedback.

19. A non-transitory computer readable storage medium having a program embodied thereon, the program executable by a processor to perform a method for training a quality-prediction engine, the method comprising:

translating a document in a source language to a target language using a machine-translation engine to obtain a machine-generated translation;

comparing the machine-generated translation with a human-generated translation of the document, the human-generated translation in the target language;

generating a mapping between features of the machine-generated translation and features of the human-generated translation based on the comparison, the mapping allowing determination of trust levels associated with translational accuracy of future machine-generated translations that lack corresponding human-generated translations; and calibrating the quality prediction engine, wherein calibrating the quality-prediction engine includes:

obtaining a plurality of opinions for a plurality of sample translations generated by execution of the machine-translation engine, each of the opinions from a human and indicating a perceived trust level of corresponding sample translations;

using the quality-prediction engine to determine a trust level of each of the plurality of sample translations;

determining a relationship between the plurality of opinions and the trust levels of the plurality of sample translations; and tuning the mapping to minimize any difference between the plurality of opinions and the trust levels of the plurality of sample translations.

20. A non-transitory computer readable storage medium having a program embodied thereon, the program executable by a processor to perform a method for training a quality-prediction engine, the method comprising:

translating a document in a source language to a target language using a machine-translation engine to obtain a machine-generated translation;

comparing the machine-generated translation with a human-generated translation of the document, the human-generated translation in the target language;

generating a mapping between features of the machine-generated translation and features of the human-generated translation based on the comparison, the mapping allowing determination of trust levels associated with translational accuracy of future machine-generated translations that lack corresponding human-generated translations; and calibrating the quality prediction engine, wherein calibrating the quality-prediction engine includes:

obtaining a plurality of opinions for a plurality of sample translations generated by execution of the machine-translation engine, each of the opinions from a human and indicating a perceived trust level of corresponding sample translations;

using the quality-prediction engine to determine a trust level of each of the plurality of sample translations;

determining a relationship between the plurality of opinions and the trust levels of the plurality of sample translations; and tuning the mapping to minimize any difference between the plurality of opinions and the trust levels of the plurality of sample translations, wherein calibrating the quality-prediction engine is automatically triggered to ensure that determined trust levels are continually consistent with user feedback.

* * * * *